(12) United States Patent
Krueger

(10) Patent No.: US 6,680,001 B1
(45) Date of Patent: Jan. 20, 2004

(54) PROTECTIVE COMPOSITION FOR PRESSURE WASHER AND APPLICATOR

(76) Inventor: David J. Krueger, 395 S. Hwy. 65, PMB 319, Lincoln, CA (US) 95648

( * ) Notice: Subject to any disclaimer, the term of this patent is extended or adjusted under 35 U.S.C. 154(b) by 0 days.

(21) Appl. No.: 10/135,283

(22) Filed: Apr. 30, 2002

Related U.S. Application Data

(60) Provisional application No. 60/287,504, filed on Apr. 30, 2001.

(51) Int. Cl.⁷ .............................. C09K 3/18; C23F 11/12
(52) U.S. Cl. ................... 252/70; 106/14.13; 106/14.28; 422/14; 422/17
(58) Field of Search .................... 252/70; 106/14.13, 106/14.28; 422/14, 17

(56) References Cited

U.S. PATENT DOCUMENTS 4,145,411 A  * 3/1979  Mende ........................ 424/45
4,353,745 A  * 10/1982  Ebbeler ........................ 106/2

OTHER PUBLICATIONS

Derwent Abstract No. 1998–310183, abstract of Russian Patent Specification No. 2093548 (Oct. 1997).*

* cited by examiner

Primary Examiner—Anthony J. Green
(74) Attorney, Agent, or Firm—Charles A. Wilkinson; Clinton H. Wilkinson

(57) ABSTRACT

A composition for lubricating, preventing mineral deposit buildup, and expelling any standing water from the internal parts of a pressure washer, as well as a pressurized container for applying such composition across the internal parts of the pressure washer through the water inlet valve is provided.

19 Claims, 2 Drawing Sheets

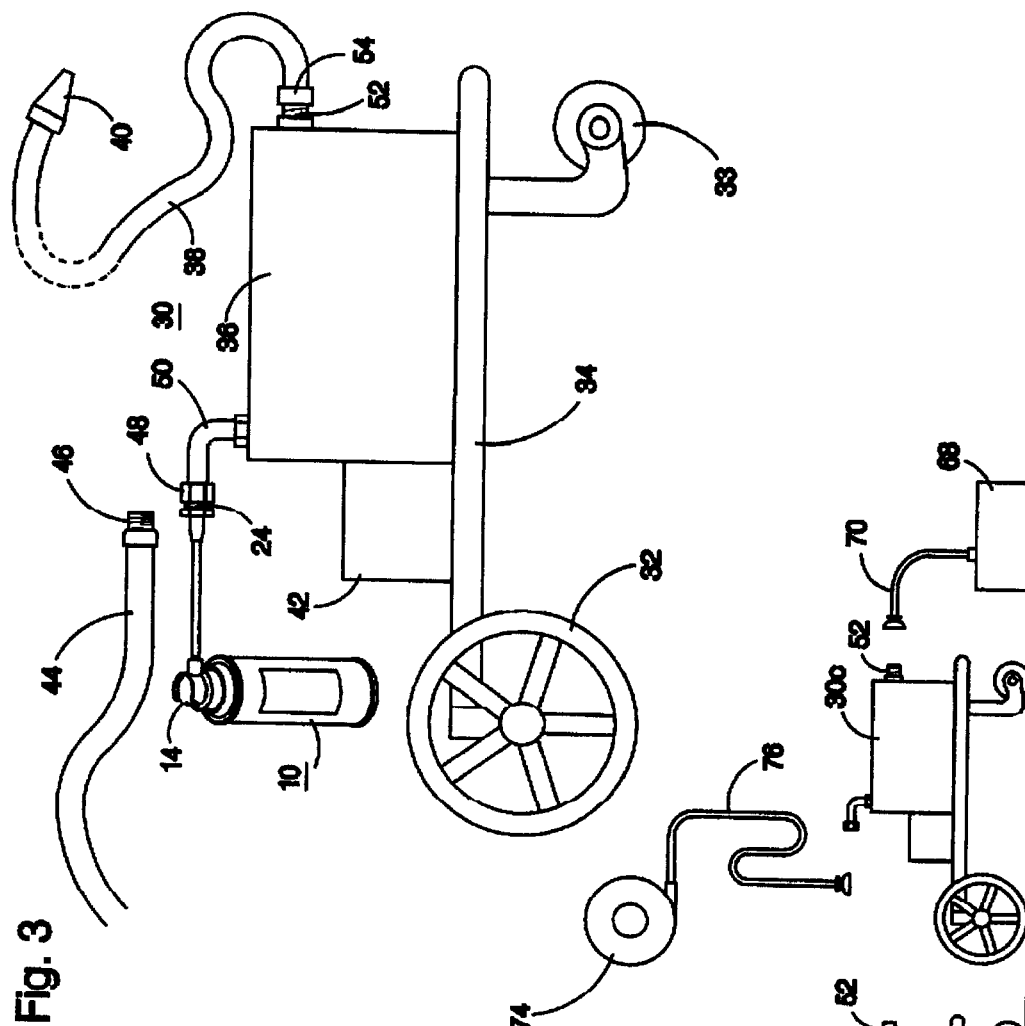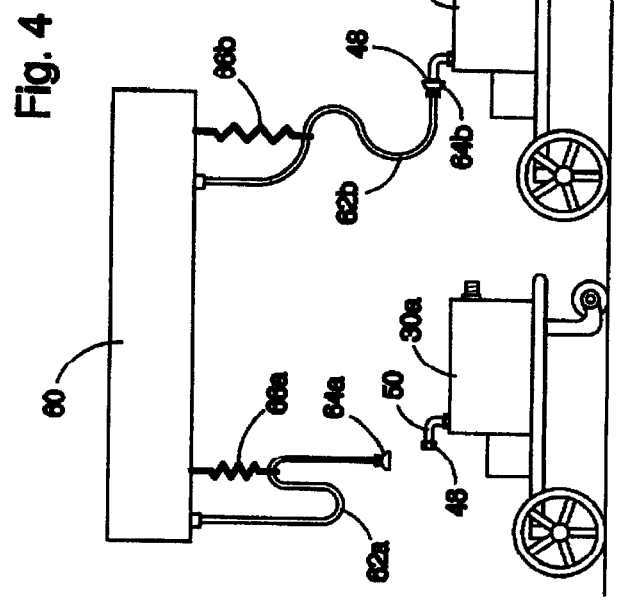

PROTECTIVE COMPOSITION FOR PRESSURE WASHER AND APPLICATOR

CROSS REFERENCE TO RELATED APPLICATIONS

This application is based on provisional patent application Ser. No. 60/287,504 filed on Apr. 30, 2001.

BACKGROUND OF THE INVENTION

1. Field of the Invention

This invention relates to a combination glycol, lubricant, and mineral deposit inhibitor composition to be applied to pressure washers and the like, and more particularly to a gas pressurized dispensing container for holding such composition having a specially designed nozzle for injecting such composition directly into the interior of pressure washers to protect the internal parts and water lines of such pressure washers.

2. Preliminary Discussion

The prior art has provided pressure washers for use in washing a variety of surfaces such as wood, tile, concrete, automobiles, home sidings and the like. A pressure washer typically comprises a source of a pressurized washing fluid such as water that fluidically communicates with an operator wand via a high-pressure hose maintained under high pressure, e.g., about 1200 to 3000 psi. Pressure washers conventionally include a pump assembly that includes a plurality of pumping pistons driven by either an electric motor or an internal combustion motor. Fluid is commonly supplied to the pump by an ordinary garden hose.

Until recently, pressure washers were almost exclusively commercial machines, and were not priced within easy reach of most homeowners. However, in the past 10 years, manufacturers have begun targeting homeowners with lightweight, general-purpose pressure washers that are priced similarly to power lawnmowers. Such portable high-pressure water pump systems are comparatively inexpensive, reliable, compact, and easy to use, and consequently, have gained considerable popularity among residential users.

Although such pressure washers are easy to use, many new users do not take the time to properly care for or clean such machines. For example, after each use, there is a small amount of water remaining in the unit which, if not removed before the onset of cold weather, can freeze and damage the internal parts of the washer. In addition, particularly in areas having hard water, continuous contact with dissolved minerals over time tends to cause mineral deposits such as calcium and magnesium carbonate compounds to build up on the pistons and valves of the pressure washer, gradually causing a significant drop in water pressure exertable by the pressure washing machine, and, if not removed, eventually causing the mechanical parts to stop working as water flow is restricted. In addition, manufacturers of pressure washers customarily test each machine under pressure prior to shipping to a point of distribution or sale, where the device may sit in an unheated storage area for several months or more. During such period, cold weather can freeze any residual moisture in the pump and/or the moisture may evaporate leaving thin deposits of harmful minerals. Thus, there is a need for a simple and inexpensive method and composition for clearing or removing water from the pump and for inhibiting mineral formation not only for home users, but also for manufacturers after testing but prior to sale.

Paint sprayers are in broad aspects similar to pressure cleaning sprayers and when used to spray water based paints in particular are also subject to freezing and buildup of internal mineral deposites derived from water used for internal washing of such sprayers.

Various anti-freeze compositions are known in the prior art, as are compositions for reducing mineral deposit buildup in pipes, water pumps, and the like. However, the inventor is not aware of either an aerosol or non-aerosol composition that combines the elements of the present invention in the same percentage mixture as the current composition. In addition, known methods for applying such a composition are generally messy and cumbersome. Thus, there is a need for a simple and inexpensive method and means for applying such composition through the water line and across the internal parts of a pressure washer, which method and means the present inventor has provided using a gas pressurized dispensing container incorporating a short hose or tubing connection that is threadably securable to the pump inlet of the pressure washer so that the protective composition can be directly sprayed into the pressure washer. Such composition not only removes water droplets from the system but also lubricates and protects the system as well as cleans and prevents mineral formation on the internal exposed parts of such pressure washer. With the addition of a suitable connection to a paint sprayer or the like the same aerosol containers can be used to deliver the anti-freeze and mineral deposite inhibitor to paint spray and the like equipment as well.

OBJECTS OF THE INVENTION

It is an object of the invention to provide a composition to be applied to the internal parts of a pressure washer to clear excess water or moisture from such exposed internal parts.

It is a further object of the invention to provide a composition that inhibits the formation of mineral deposits on the exposed internal parts of a pressure washer.

It is a still further object of the invention to provide a composition and method for depositing a thin lubricating layer across the exposed internal parts of a pressure washer to protect such washer from damage from freezing and mineral buildup.

It is a still further object of the invention to provide an arrangement whereby the composition the invention can be applied internally to other apparatus than pressure washers such as paint sprayers and the like.

It is a still further object of the invention to provide both an aerosol and non-aerosol composition to be applied to the water inlet of a pressure washer.

It is a still further object of the invention to provide a means for applying such composition wherein the dispensed flow rate may be controlled to an acceptable level throughout the progressive dispensing of the product from the container.

It is a still further object of the invention to provide a simple, inexpensive, and easy means for applying such composition to a pressure washer in the form of an aerosol container holding such composition and having an nozzle adapted for attaching such aerosol to the water inlet of such washer.

SUMMARY OF THE INVENTION

A composition for lubricating, preventing mineral deposit buildup, and removing standing water from the internal parts of a pressure washer is provided, as well as an applicator in the form of a gas pressurized container for propelling the composition across the internal parts of the pressure washer. The aerosol version of the composition is obtained by mixing predetermined amounts of glycol, a nonionic surfactant, deionized water, sodium benzoate, and a mineral oil lubricant, while the non-aerosol version is similarly composed but may contain a somewhat higher water percentage by weight. In the preferred embodiment, the composition is provided in a pressurized container having a threaded nozzle on the end of a flexible tube so that the container can be secured directly to the water inlet of the pressure washer and then expelled directly across the internal parts of the pressure washer, particularly the pistons, so that any standing water in the washer is forced out of the system. The preferred propellant is a blend of hydrocarbon gases yielding 46 psig of pressure in the container at 70 degrees Fahrenheit, with the ratio of gas to concentrate most preferably about 15 to 25. In addition to preventing the pistons of the pressure washer from being damaged by freezing water when stored, the composition further protects against mineral buildup in the internal parts of the system, and also acts as a lubricant.

BRIEF DESCRIPTION OF THE DRAWINGS

FIG. 3 is a diagrammatic side view of the aerosol container and fitting of the invention coupled to a pressure washing apparatus.

FIG. 4 is a diagrammatic side view of a simple industrial line arrangement for charging the protective composition of the invention to spray apparatus before such apparatus are shipped to customers.

DETAILED DESCRIPTION OF PREFERRED EMBODIMENTS

Figure 1:
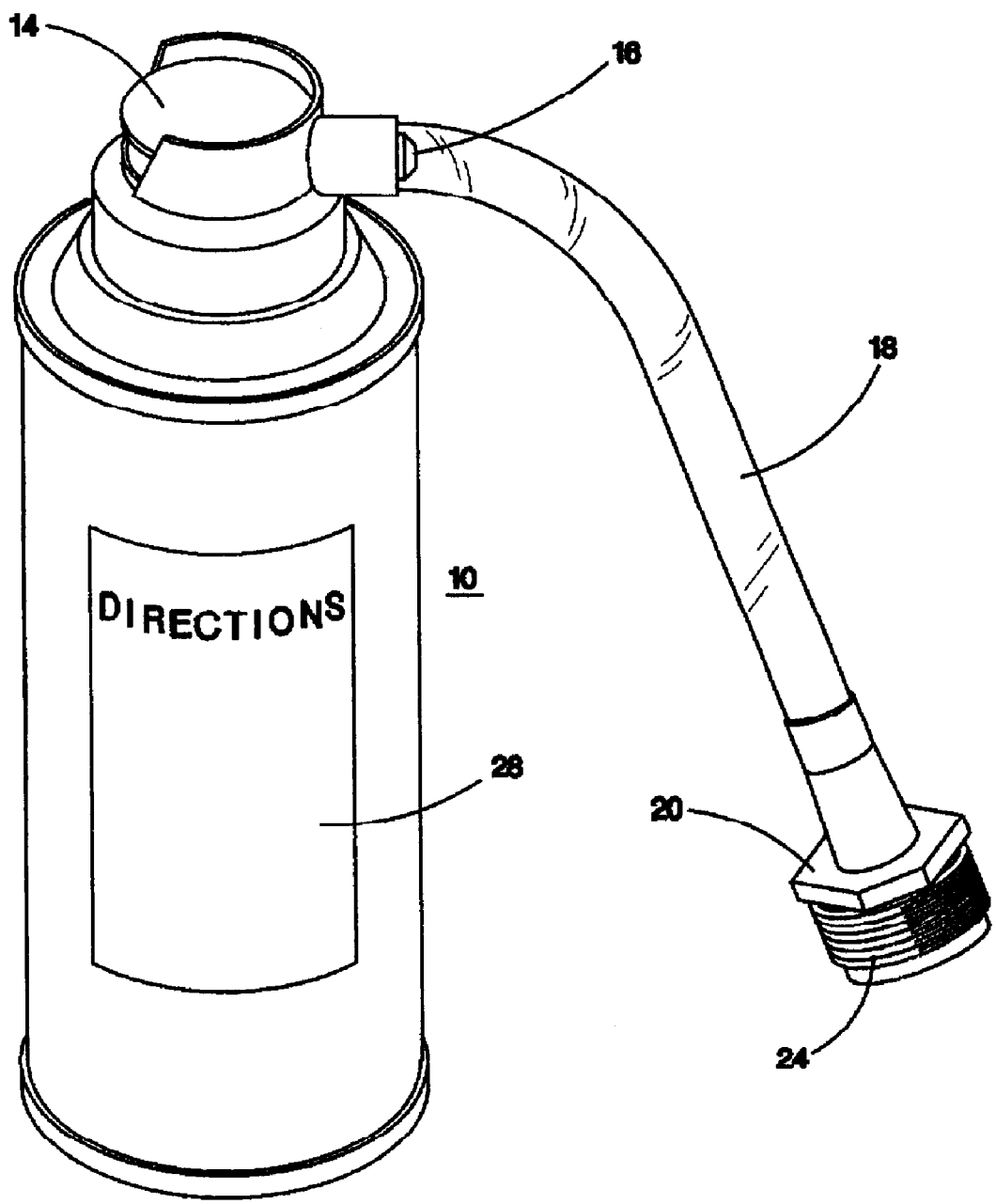
FIG. 1 is an isometric view of the gas pressurized aerosol container for applying the composition of the invention across the internal parts of a pressure washer.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

In its broadest aspect, the invention is directed to providing a composition for lubricating, preventing mineral deposit buildup, and removing standing water from the internal parts of a pressure washer. Additionally, the invention includes a gas pressurized or aerosol container for applying such composition through the water pump inlet of the pressure washer and across the internal exposed parts of the washer, although the product is also provided in a non-aerosol form.

In both the aerosol and non-aerosol versions of the product, the composition of the invention is generally similar. The aerosol version of the composition of the invention is obtained by mixing predetermined amounts of propylene glycol, a nonionic surfactant, deionized water, sodium benzoate, and a mineral oil lubricant. Glycol is the collective term for dihydric alcohols or alcohols containing two hydroxyl groups connected to different carbon atoms. Propylene glycol is known for having a low freezing point and is commonly used in antifreeze solutions, or as a coolant in refrigeration systems, and also has some lubricating properties. In a preferred embodiment of the invention, the propylene glycol component comprises 50.0–90% of the total composition. Most preferably, the propylene glycol component comprises approximately 80–90.0% of the total composition. The propylene glycol component is miscible with the deionized water component, which comprises preferably about 4.014 8.0% of the total composition, and most preferably approximately 4.0–6.0% of the composition. The nonionic surfactant acts as an emulsifier between the propylene glycol/water mixture, essentially stabilizing the mixture and preventing breakdown of such mixture. The preferred surfactant is a nonylphenol, a mixture of isomeric monoalkyl phenols, including approximately 9 moles of ethylene oxide. The nonionic surfactant comprises about 0.05–5% of the composition, and most preferably approximately 0.5–3.0% of the composition. Also included in the mixture is sodium benzoate, which prevents rust, corrosion, and serves as a mildew inhibitor, and is added to prevent mineral formation on the internal parts of the water pump and lines of the pressure washer. The sodium benzoate preferably comprises about 0.002% to 2.0% of the composition, and most preferably approximately 0.005–0.1% of the composition. Mineral oil is also added to provide a thin double lubricant or lubricating film over the internal parts of the washer. The mineral oil is preferably approximately 1.0–1.5% of the composition, and most preferably between 1.1–1.4% of the composition.

Another aspect of the aerosol version of the invention is the aerosol device, itself consisting of a pressurizable container fitted with a diffusion means comprising a valve, said container comprising a propulsion means for application of the composition such as, for example, a propellant gas plus the composition of the invention. Pressurized dispensing containers have been used for dispensing a wide variety of products from mobile to viscous liquid products and typically employ a liquid propellant such as a hydrocarbon or fluorocarbon having a sufficiently high vapor pressure at normal working temperatures to propel the product through the dispensing apparatus. The propellant used in the combination with the present composition is preferably a blend of the hydrocarbon gases propane, isobutane, and butane, which ratio yields approximately 46 psig of pressure in the container at 70 degrees Fahrenheit. The ratio of gas to concentrate should be approximately 20 to 80, or more preferably 10 to 30, and most preferably approximately 15 to 25. Such ratio is preferred since it yields no flame extension, and results in a non-flammable mixture. Other acceptable gasses include difluoroethane, dimethyl ether, nitrous oxide, and tetraflouoroetherane. If nitrous oxide is used, the composition may include preferably 1.0–3.0% nitrous oxide, and most preferably approximately 1.0–2.5% nitrous oxide. The use of carbon dioxide and nitrogen as propellants is not preferred. A disadvantage of carbon dioxide as a propellant is that it varies with temperature so that care must be taken in filling the container in order to avoid excessive initial gas pressures. In addition, the use of relatively insoluble propellant gasses such as nitrogen has had the disadvantage that the flow rate of the dispensed product tends to decrease as the gas pressure is depleted during progressive dispensing of the product.

FIG. 1 illustrates a gas pressurized or aerosol container 10 for holding and applying the anti-freeze, lubricant, and mineral formation inhibiting composition of the invention. Container 10 is similar to those well known in the aerosol can art and contains a mixture of the composition as well as the blend of hydrocarbon gases that serve as the propellant.

Figure 2:
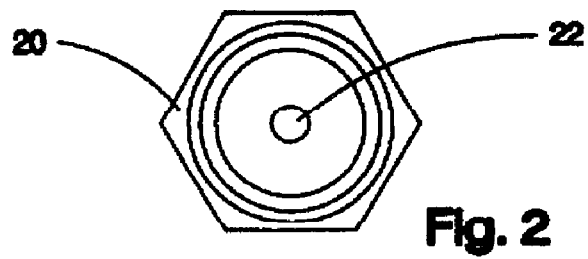
FIG. 2 is an end view of the nozzle of the gas pressurized aerosol container of the invention.

When valve 14 is depressed, the composition is expelled from container 10 out opening 16, through tube 18, and out opening 22 in threaded nozzle 20. Situated or disposed on nozzle 20 are male threads 24 which are threaded into the female threads on the pump inlet of a pressure washer, in the same outlet where typically a water supply hose such as a normal garden hose is threadably received. Nozzle 24 is specially sized to be threaded to the pump inlet, thereby easily gaining access to the pump interior, and connecting such container 10 to the pump inlet is, therefore, simple and easy. As shown in FIG. 2 the end of the nozzle 20 has a round configuration to connect with the coupling of the usual pressure washer plus hexagon wrench surfaces for the application of a wrench in tightening into the coupling to prevent leakage. While almost all pressure washers are provided with female couplings for coupling to the end of a normal garden hose, in the case where the washer is provided with another coupling, for example in very heavy industrial type washers, the nozzle 24 on the end of the tube 18 will be dimensioned to conform to such coupling. Once the nozzle 20 of container 10 is threaded to the pump inlet, valve 14 is depressed, and the pressurized composition is propelled into the pump inlet and into the interior of the pressure washer. The use of the pressurized container allows the amount and flow of the protective composition to be easily regulated. As the composition is being sprayed into the washer, the starter cord of the pressure washer should be pulled slowly to turn the motor over for at least several cycles, thereby causing the pistons in the water pump to actuate and allowing the composition to be spread more evenly over the piston walls. In addition, actuating the pistons helps to ensure that all water that may be left in the pump or water line is removed. The composition should be continued to be sprayed into the pump inlet until fluid is visible flowing out of the pump outlet 50. At such time, the composition should be evenly spread over the internal parts of the device, thereby protecting as well as lubricating the pistons and water line. Thereafter, the container 10 may be removed by rotatably disengaging the threaded fitting from the water intake of the pump by rotating the hose coupling. As a result of the protective film covering of the composition now covering the pump interior, the water inlet may be left open to the atmosphere, although a separate plug may also be inserted into the water inlet if desired. Directions for use of the aerosol can of protective composition may be on the side of the can as designated by reference numeral 28 or can be supplied separately.

FIG. 3 shows a diagrammatic side view of a pressure washing apparatus 30 mounted upon a pair of wheels 32 for mobility. A small pivoting wheel 33 is provided at the opposite end of apparatus. The wheels 32 and 33 are mounted upon a short platform 34 upon the upper surface of which is mounted a cylinder pump assembly 36 of conventional type for pressuring fluid, usually water, which is expelled under high pressure through pressure hose 38 and pressure nozzle 40 to a surface, not shown, to be washed. A motor of any suitable type not shown may be provided within motor chamber 42 to operate the pistons of the apparatus, also not shown, to provide a high-pressure supply of fluid or water for pressure cleaning of surfaces. The supply of water for washing is provided from hose 44 shown here in the form of a normal garden hose having a conventional nozzle 46 on the end, which, during operation of the pressure washing function, will be coupled with hose coupling 48 on feed tube 50 mounted upon the cylinder assembly 36. The water supply hose 44 has in FIG. 3 been disconnected from the pressure washing apparatus preparatory to winter storage or other period of nonuse. In its place has been temporarily mounted an aerosol can 10 containing the protective composition of the invention. Threaded nozzle portion 24 of aerosol can 10 has been substituted temporarily for the nozzle 46 of water supply hose 44 in the coupling 48 of supply tube 50 of the pressure apparatus 30. (The aerosol can 10 and connections are shown distortably large in diagrammatic FIG. 3 for visibility and emphasis of its importance to the invention. A nozzle and coupling connection 52 and 54 serves to connect the pressure hose 38 to the pressure piston assembly or unit 36 so the pressure hose 38 is disconnectable during nonuse.

In the use of the aerosol material to winterize the pressure unit 30 as explained in more detail hereinabove the water supply hose 44 will be disconnected form the coupling 48 and the matching nozzle 24 of the aerosol can 10 will be connected to the coupling 48 of the feed tube 50 while the motor 42 of the unit is stopped. The pressure hose 38 will also usually also be disconnected at this time by uncoupling the female coupling 54 from the male coupling 52. By operation of the spray lever 14 on the pressure can 10 the contents of the can will be expelled under internal pressure through the feed tube 50 into the cylinder unit 36. After first expelling a charge of the composition of the invention into the unit 36 the motor within housing 42 should be turned over by hand gradually working the protective composition through the apparatus until some begins to run out of the disconnected nozzle 52, at which point one may assume that the internal surfaces are fairly well coated and any residual moisture will have been absorbed into the protective composition or sufficiently diluted to render such moisture harmless during storage or in operation. When the apparatus is again used the small amount of protective material expelled with the washing fluid will be completely harmless.

While the inventor has provided a novel means for applying the aerosol version of the composition across the internal lines and parts of a pressure washer, a non-aerosol version of the composition is also provided. The non-aerosol version may be preferred by manufacturers of such washers, who usually will wish to apply such composition to each of its new pressure washer products after such products have been tested. Typically, a manufacturer will test each of its products prior to shipping such product for sale. However, water might remain in the water lines from such tests, which the manufacturer is desirous to have removed to prevent any possible damage to the units, particularly due to freezing of such water as such units are typically stored in an unheated warehouse for at least some time prior to shipping to individual retail sellers of such products. Manufacturers can utilize larger amounts of the composition in a non-aerosol version rather than as an aerosol simply by, for example, attaching a hose to a large tub of such composition, and, using a small generator or the like, dispensing such composition into all of such washers by pressure application.

FIG. 4 is a diagrammatic side elevation of a portion of the final operation in an industrial operation producing pressure spray apparatus showing the application of the protective composition of the invention to such apparatus. In FIG. 4 there are shown three pressure spray apparatus 30*a*, 30*b* and 30*c* similar to the apparatus shown diagrammatically in FIG. 3. Such apparatus are understood as being newly constructed and tested and ready for shipping to customers for the apparatus. In the testing of such apparatus a water line is coupled to the apparatus, the motor is activated and the pressure of the resulting stream of pressurized fluid, i.e. water, is measured. If the apparatus passes the test it can then be shipped to suppliers and other customers. The testing stage naturally leaves a considerable amount of moisture within the apparatus, which normally may not be damaging. However, since the apparatus may be stored for long periods in unheated warehouses and/or shipped in unheated cargo containers, trucks and the like, the apparatus and particularly the cylinder and piston walls and the like may be damaged by freezing of the residual water left in the apparatus by freezing and in addition thin deposits from the moisture may be precipitated out damaging the apparatus.

In order to prevent such damage the apparatus can be charged with the protective composition of the invention from aerosol application apparatus as explained above. However, while eminently suitable for use by end users of such apparatus to prevent freeze and precipitation material damage, such charging is more expensive and inconvenient than necessary. However, it is also possible to charge the protective composition of the invention by a non-aerosol method. One industrial arrangement for so doing is shown in FIG. 4 in which there is shown first or to the left an elevated reservoir 60 of the protective composition. Two hoses are connected to the reservoir 60. Any suitable valve means not shown may be provided in the supply hoses 62a and 62b. Preferably these would be operated by an electric hand control or the like, not shown, but readily reachable by the personnel applying the material via the supply hoses 62a and 62b to the spray apparatus. The supply hoses 62a and 62b have large flexible end pieces 64 designed to be placed over the end of the couplings 48 on the fill or supply tubes 50 of the pressure spray apparatus. Supply hose 62a is shown retracted by the tension of coil spring 66a from the coupling 48 of apparatus 30a. Supply hose 62b, however, has been pulled downwardly and a flexible end piece 64b placed over the coupling 48 of apparatus 30b allowing the non-aerosol material in reservoir 60 to run or be fed by gravity into the cylinders of the pressure apparatus 30b. When material starts to exude slightly from the nozzle 52 of apparatus 52 particularly after a short operation of the cylinder apparatus either by hand or by a special low speed motor, not shown, the valve (not shown) on supply hose 62b is closed and the apparatus is moved to the next position shown at the end of the line occupied by spray apparatus 30c. At this location an air or other gas flow such as an inert gas such as nitrogen can be used via hose 76 to pass a gentle flow of gas through the apparatus while the pistons move to force out excess protective material which can be caught in the drain arrangement 68 including a flexible connection 70 placed on the coupling nozzle 52. It will be understood that the centrified blower 72 delivers its, in this case air, through flexible hose 76.

The following are the preferred and most preferred limits for each component of the mixture are as follows. The preferred limits for the propylene glycol are about 3.0–80% of the composition, and most preferably approximately 50–80%. Water comprises preferably 3.0–95.0% of the composition, and most preferably approximately 3.0 to 26.0%. The nonylphenol nonionic surfactant preferably comprises 1.0–10.0% of the composition, and most preferably approximately 1.0–5.0% of the composition, while the sodium benzoate component preferably comprises 0.005–1.0% of the composition, and most preferably approximately 0.005–0.2% of the composition. Finally, the mineral oil preferably comprises 0.05–1.0% of the composition, and most preferably approximately 0.1–1.0% of the composition.

The present invention provides not only a very effective protective composition for pressure washers, but also a particularly effective and convenient method and package for using or applying it by everyday or only occasional users of pressure washers as well as other pressure spray apparatus to apply a correct amount of protective material to the internal surfaces of the apparatus to prevent freezing of any residual water in the equipment during cold weather and to inhibit the formation of detrimental mineral deposits in the pressure washing apparatus. The invention has been found to be not only practical, but also usable by almost anyone who can follow a few simple instructions. The use of aerosol application of the material using normal garden hose connections familiar to everyone makes the application almost foolproof.

While the present invention has been described at some length and with some particularity with respect to the several described embodiments, it is not intended that it should be limited to any such particulars or embodiments or any particular embodiment, but it is also to be construed with references to the appended claims so as to provide the broadest possible interpretation of such claims in view of the prior art and, therefore, to effectively encompass the intended scope of the invention.

I claim:

1. A film forming concentrate solution for use in protecting the interior components and water lines of a pressure washer from freezing and mineral deposit buildup comprising an aqueous solution of from about 50.0–90.0% by weight of a glycol component, about 4.0–8.0% by weight of a deionized water component, about 0.053.0% by weight of a nonionic surfactant component, about 0.002–2.0% by weight of a sodium benzoate component, and about 0.0–1.5% by weight of a mineral oil component.

2. The solution as claimed in claim 1, wherein said glycol component comprises propylene glycol.

3. The solution as claimed in claim 1 additionally comprising about 1.0–3.0% of a propellant gas, forming an aerosol solution.

4. The solution as claimed in claim 3 wherein said propellant gas is selected from the group consisting of propane, isobutane, and butane, difluoroethane, dimethyl ether, nitrous oxide, and tetraflouoroetherane.

5. The solution as claimed in claim 3 wherein said propellant gas is comprised of a blend of propane, isobutane, and butane yielding about 46 psig of pressure in a container at 70 degrees Fahrenheit, the ratio of gas to concentrate about 20 to 80.

6. The solution as claimed in claim 5 wherein the ratio of gas to concentrate is about 10 to 30.

7. The solution as claimed in claim 6 wherein the ratio of gas to concentrate is about 15 to 25.

8. The solution as claimed in claim 2 wherein said propylene glycol comprises about 80–90% by weight of the solution.

9. The solution as claimed in claim 1, wherein said deionized water component comprises about 4.0–6.0% by weight of the composition.

10. The solution as claimed in claim 1, wherein said nonionic surfactant component comprises about 0.5%–3.0% by weight of the composition.

11. The solution as claimed in claim 10, wherein said nonionic surfactant component is nonylphenol including about 9 moles of ethylene oxide.

12. The solution as claimed in claim 1, wherein said sodium benzoate component comprises about 0.005–0.1% by weight of the composition.

13. The solution as claimed in claim 1, wherein said mineral oil component comprises about 1.1%–1.4% by weight of the composition.

14. A film-forming concentrate solution for use in protecting the interior components and water lines of a pressure washer from freezing and mineral deposit buildup comprising an aqueous solution of from about 3.0–90.0% by weight of a glycol component, about 3.0–95% by weight of an aqueous solution, about 1.0–10.0% by weight of a nonionic surfactant component, about 0.005–1.0% by weight of a sodium benzoate component, and about 0.05–1.0% by weight of a mineral oil component.

15. The solution as claimed in claim 14, wherein said glycol component comprises about 50–80% by weight of propylene glycol.

16. The solution as claimed in claim 14, wherein said aqueous solution is comprised of about 3.0–26.0% by weight of water.

17. The solution as claimed in claim 14, wherein said nonylphenol nonionic surfactant component comprises about 1.0–10.0% by weight of the composition.

18. The solution as claimed in claim 14, wherein said sodium benzoate component comprises about 0.005–0.2% by weight of the composition.

19. The solution as claimed in claim 14, wherein said mineral oil component comprises about 0.1–1.0% by weight of the composition.

* * * * *